(12) United States Patent
Ko et al.

(10) Patent No.: US 7,247,681 B2
(45) Date of Patent: Jul. 24, 2007

(54) PREPARATION METHOD OF COPOLYMER

(75) Inventors: Young-Hoon Ko, Taejeon (KR); Jae-Young Ko, Taejeon (KR); Jin-Man Hwang, Seoul (KR)

(73) Assignee: Korea Kumho Petrochemical Co., Ltd. (KR)

( * ) Notice: Subject to any disclaimer, the term of this patent is extended or adjusted under 35 U.S.C. 154(b) by 353 days.

(21) Appl. No.: 10/940,264

(22) Filed: Sep. 14, 2004

(65) Prior Publication Data

US 2005/0176895 A1 Aug. 11, 2005

(30) Foreign Application Priority Data

Feb. 6, 2004 (KR) ...................... 10-2004-0007867

(51) Int. Cl.
*C08F 236/10* (2006.01)
*C08C 19/22* (2006.01)
*C08C 19/25* (2006.01)

(52) U.S. Cl. ................ 525/332.9; 525/342; 525/359.3; 525/375; 525/379; 526/340

(58) Field of Classification Search ............ 525/332.9, 525/342, 359.3, 375, 379; 526/340
See application file for complete search history.

(56) References Cited

U.S. PATENT DOCUMENTS

| 4,555,548 | A | | 11/1985 | Ueda et al. ................. 525/237 |
| 6,133,388 | A | * | 10/2000 | Lee et al. .................... 526/180 |
| 6,329,467 | B1 | | 12/2001 | Halasa et al. ............... 525/196 |
| 2002/0123554 | A1 | * | 9/2002 | Ko et al. .................... 524/492 |
| 2006/0135701 | A1 | * | 6/2006 | Lawson et al. .......... 525/331.9 |

FOREIGN PATENT DOCUMENTS

| KR | 10-0279347 | | 11/1995 |
| KR | 96007313 | B1 | 5/1996 |
| KR | 96007316 | B1 | 5/1996 |
| WO | WO 94/13728 | | 6/1994 |

OTHER PUBLICATIONS

Quirk et al., Characterization of the Functionalization Reaction Product of Poly(styryl) lithium with Ethylene Oxide, Journal of Polymer Science: Part A: Polymer Chemistry, vol. 26, pp. 2031-2037, 1988.
Hattori et al., Synthesis of Polymers with Primary Amino End Groups, 2 a), Synthesis of Polyisoprene with Primary Amino End Groups and Poly(isoprene-b-y-benzyl-L-glutamate)s, Makromol. Chemistry, vol. 184, pp. 1355-1362, 1983.
Quirk et al., Carbonation of Polymeric Organolithium Compounds: Effects of Chain End Structure, Journal of Polymer Science: Part A: Polymer Chemistry, vol. 30, pp. 2349-2355, 1992.

* cited by examiner

*Primary Examiner*—Roberto Rabago
(74) *Attorney, Agent, or Firm*—Davidson, Davidson & Kappel LLP

(57) ABSTRACT

The present invention provides a method for preparing a copolymer useful for the manufacture of tires by coupling the ends of a living polymer obtained from copolymerization of a diene monomer and a vinyl aromatic monomer in the presence of an organolithium catalyst and a hydrocarbon solvent with a multi-reactive polysiloxane compound and then modifying the remaining uncoupled ends of the polymer with an amine compound. The use of the copolymer thus obtained for the fabrication of tires improves the affinity to silica as well as carbon black used as a reinforcing material and provides enhanced properties required for tires, such as increased wet traction, reduced rolling resistance, and increased tread wear.

14 Claims, No Drawings

PREPARATION METHOD OF COPOLYMER

BACKGROUND OF THE INVENTION

1. The Field of the Invention

This invention relates to a method for preparing a copolymer from a conjugated diene monomer and a vinyl aromatic monomer. More particularly, this invention relates to a method for preparing a copolymer useful for the fabrication of tires by coupling the active ends of the copolymer with a multi-reactive polysiloxane and subsequently modifying the remaining active ends of the copolymer with a mono-reactive amine compound.

2. Related Prior Art

Regarding a conjugated diene polymer useful as a rubber material for tires, such as a styrene-butadiene copolymer, the conjugated diene polymer prepared in the presence of an organolithium catalyst in an organic solvent is controllable in regard to molecular structure such as the vinyl structure of conjugated diene, the styrene content, the styrene block percentage, and so forth, which cannot be controlled by emulsion polymerization, providing required properties as a material for tires. The use of the rubber prepared by the solution polymerization for fabrication of tires guarantees very excellent properties of tire products, such as rolling resistance and wet traction, relative to the use of a styrene-butadiene rubber (SBR) prepared by emulsion polymerization. In addition, the use of an organolithium catalyst for polymerization introduces different functional groups to the ends of the molecule to enable the control of cold flow at the ambient temperature and also to increase the compatibility with a reinforcing material such as carbon black or silica, thus enhancing tread wear, reducing rolling resistance and increasing wet traction.

Among the conventional methods to increase the compatibility of the conjugated diene polymer prepared by solution polymerization with carbon black and silica, U.S. Pat. No. 4,555,548 discloses a method for increasing the compatibility of rubber with carbon black by modifying the ends of the molecule with an amine compound such as amino benzophenone to produce a rubber superior in dynamic properties and mechanical properties to the existing rubbers. However, the rubber prepared by this method has a poor processability in mixture and a high cold flow, which is an important factor of storage stability, causing a problem after a long-term storage. The use of this rubber for a tire containing silica as a reinforcing material (hereinafter, referred to as "silica tire") may result in poor compatibility with silica to deteriorate the mechanical properties and the dynamic properties (e.g., rolling resistance and wet traction) of the tire. Consequently, the use of the rubber does not have any merit in the fabrication of silica tires.

U.S. Pat. No. 6,329,467 describes a method of using a mixture of tin tetrachloride and silicon tetrachloride as a coupling agent for the purpose of reducing the processability and the rolling resistance of the carbon black composition. The polymer prepared by this method has no functional group contributing to the compatibility with a reinforcing material and hence a poor compatibility with the reinforcing material in the silica composition, making it difficult to prepare a rubber suitable to the silica tire. Particularly, this method deteriorates the properties of the silica composition because the tin tetrachloride compound breaks the bonds between tin and the polymer by stearic acid added as a vulcanizing accelerator in the mixing step.

In addition, U.S. Pat. No. 6,133,388 discloses a method of maximizing the compatibility with a reinforcing material by modifying both ends of the molecule into functional groups. However, solution viscosity rapidly increases during a polymerizing procedure employing such an end modifying method, thus it is difficult to apply to a commercialized process. This polymer having a linear molecular structure is very disadvantageous to apply concerning a compound processability and storage stability point of view.

Korean Patent Laid-open Nos. 94-019797 and 94-019795 disclose methods for enhancing the compatibility with silica used as an inorganic reinforcing material, which methods involve dispersing polydimethylsiloxane in a styrene-based resin composition to remarkably enhance tread wear and cold shock resistance. However, the polymer composition prepared by dispersion of polydimethylsiloxane has no covalent bonds between the polydimethylsiloxane and the organic polymer resin, readily exhibiting phase separation, and contains neither a polar group nor a hydrophilic group in the polydimethylsiloxane, resulting in a low affinity to the inorganic reinforcing material and hence a deterioration of the compatibility with the inorganic reinforcing material.

Consequently, the modification of the polymer that is a highly reactive organic material is necessary for enhancing the compatibility of organic and inorganic materials in the development of such an organic/inorganic composite material, and many studies have been made on the polymer modification in a physical way. For example, Korean Patent Laid-open No. 95-704405 discloses a method of polymerizing hexamethylcyclotrisiloxane at the end of a living polymer block. This method may solve the problem in regard to phase separation into polysiloxane and the organic layer but still provides a high cold flow of the polymer and a deterioration of mixing processability as mentioned in the preceding methods.

In addition, in an attempt to increase the miscibility of the organic and inorganic materials, the ends of an anionic living polymer can be reacted with ethylene oxide (J. Polym. Sci., Part A: Polym. Chem., 26, 2031 (1988)), diphenylethylene (J. Polym. Sci., Part A: Polym. Chem., 30, 2349 (1992)), or N-(benzylidene)-trimethylsilylamine (Makromol. Chem., 184, 1355 (1983)). However, this method has a limitation in acquiring sufficient compatibility with an inorganic reinforcing material.

Accordingly, there is a demand for a novel polymer excellent in miscibility with inorganic fillers used in the fabrication of tires, while improving the shortcoming of the existing polymers.

SUMMARY OF THE INVENTION

In an attempt to develop a rubber excellent in compatibility with both silica and carbon black, the inventors of the present invention have found out that the rubber composition using silica or carbon black alone, or a mixture of silica and carbon black as a reinforcing material can be remarkably enhanced in mechanical properties and dynamic properties with a drastic improvement of cold flow, relative to the existing rubbers, by a preparation method including coupling the anion of a living polymer with a multi-reactive polysiloxane compound and then modifying the uncoupled active ends of the polymer with an amine compound.

It is an object of the present invention to provide a method for preparing a copolymer in a silica-carbon black composition for tires that is remarkably enhanced in mechanical properties, dynamic properties, and cold flow relative to the existing rubbers by introducing two functional groups each having a different property in the rubber.

To achieve the object of the present invention, there is provided a method for preparing a copolymer that includes: (a) copolymerizing a conjugated diene monomer and a vinyl aromatic monomer in the presence of an organolithium catalyst in a hydrocarbon solvent and a Lewis base to obtain a living polymer; (b) coupling the living polymer with a multi-reactive polysiloxane represented by the following formula 1; and (c) subsequently modifying the uncoupled active ends of the living polymer with a compound represented by the following formula 2 or 3:

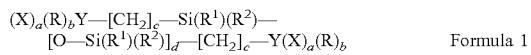
$$(X)_a(R)_bY\text{---}[CH_2]_c\text{---}Si(R^1)(R^2)\text{---}$$
$$[O\text{---}Si(R^1)(R^2)]_d\text{---}[CH_2]_c\text{---}Y(X)_a(R)_b \quad \text{Formula 1}$$

where X is a halogen atom; Y is Si or C; R is a lower alkyl group having less than 20 carbon atoms; $R^1$ is the same as R, or a hydrogen atom, a halogen-substituted alkyl group, or a halogen-substituted silane group; $R^2$ is halogen atom, or the same as $R^1$; a is from 1 to 3; b is (3–a), where a+b=3; c is from 1 to 1000; and d is from 1 to 50000,

$$(R_2{}^3NBz)_2CO \quad \text{Formula 1}$$

where $R^3$ is a lower alkyl group having less than 20 carbon atoms; and Bz is a benzene ring,

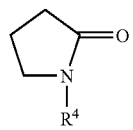

Formula 3 where $R^4$ is a lower alkyl group having less than 20 carbon atoms.

Hereinafter, the present invention will be described in further detail as follows.

The copolymer of the present invention is prepared from a conjugated diene monomer and a vinyl aromatic monomer. The conjugated diene monomer is butadiene, or isoprene, and the vinyl aromatic monomer is styrene, or alpha-methyl styrene.

Typically, the copolymer comprises 5 to 50 wt. % of a vinyl aromatic compound and 50 to 95 wt. % of a conjugated diene compound. With the content of the styrene-based compound less than 5 wt. %, the enhancement of tread wear and wet traction cannot be guaranteed. With the content of the styrene-based compound exceeding 50 wt. %, tread wear and exothermic characteristics are not improved.

In the preparation of the copolymer of the present invention, the monomers are copolymerized in the presence of an organolithium catalyst in a hydrocarbon solvent to give a living polymer.

The specific examples of the organolithium catalyst as used in the formation of the living polymer include a hydrocarbon containing at least one lithium atom, such as ethyl lithium, propyl lithium, n-butyl lithium, sec-butyl lithium, tert-butyl lithium, phenyl lithium, propenyl lithium, hexyl lithium, 1,4-dirithio-n-butane, 1,3-di(2-rithio-2-hexyl) benzene, etc. The preferred organolithium catalysts are n-butyl lithium, and sec-butyl lithium. These organolithium catalysts can be used alone or in combination of at least two of them. The added amount of the organolithium catalyst is variable depending on the target molecular weight of the polymer produced, and generally 0.1 to 5 mmol per 100 g of the monomers, preferably 0.3 to 3 mmol.

The specific examples of the hydrocarbon solvent as used for polymerization include n-hexane, n-heptane, iso-octane, cyclohexane, methylcyclopentane, benzene, toluene, etc. The preferred hydrocarbon solvents are n-hexane, n-heptane, iso-octane, cyclohexane, methylcyclopentane, benzene, toluene, etc. The preferred hydrocarbon solvents are n-hexane, n-heptane, and cyclohexane.

The content of the monomers in the hydrocarbon solvent is 5 to 40 wt. %, more preferably about 10 to 25 wt. %.

The polymerization reaction is initiated with an addition of an organolithium compound and a Lewis base. The specific examples of the Lewis base compound used to control the fine structure of the polymer include tetrahydrofuran, N,N,N,N-tetramethylethylenediamine (TMEDA), 2,2-di tetra hydrofuryl propane, di-n-propyl ether, di-isopropyl ether, di-n-butyl ether, ethylbutyl ether, triethylene glycol, 1,2-dimethoxybenzene, trimethylamine, or triethylamine. The preferred Lewis base compounds are tetrahydrofuran, 2,2-di tetra hydrofuryl propane and N,N,N,N-tetramethylethylenediamine (TMEDA). The added amount of the Lewis base is preferably in the range of about 50 ppm to 45,000 ppm with respect to the hydrocarbon solvent used for polymerization.

The typical polymerization initiation temperature is in the range of about 0 to 60° C., preferably in the range of 5 to 50° C. With the polymerization initiation temperature less than 0° C., the viscosity of the solution drastically increases with the progress of the reaction, making it difficult to achieve an active reaction and resulting in an extremely low reaction rate, which is uneconomical. With the polymerization initiation temperature exceeding 60° C., the reaction temperature suddenly rises, making it difficult to control the temperature of the reactor. The reaction pressure is suitably in the range of 1 to 10 kgf/cm$^2$.

Preferably, the polymerization reaction is continued for a sufficient period of time until all the monomers are converted to a copolymer, i.e., until a high conversion rate is achieved. The reaction time is suitably in the range of 30 to 200 minutes.

At the time when the solution polymerization is completed, the ends of the living polymer are coupled with a multi-reactive polysiloxane compound represented by the formula 1, and then the remaining active ends of the polymer are all modified with a compound of the formula 2 or 3.

The specific examples of the multi-reactive polysiloxane compound represented by the formula 1 include α,ω-bis(2-trichlorosilylethyl)polydimethylsiloxane, α,ω-bis(2-dichloromethylsilylethyl)polydimethylsiloxane, or α,ω-bis(2-chlorodimethylsilylethyl)polydimethylsiloxane. Unlike normal polysiloxanes, these multi-reactive polysiloxane compounds, which contain a polar group at their both ends, are reactive with the anion of the living polymer.

The added amount of the multi-reactive polysiloxane compound is, based on 1 mole of the living polymer, in the range of 0.01 to 0.5 mole, preferably 0.05 to 0.2 mole.

In coupling the ends of the living polymer with the multi-reactive polysiloxane compound, the coupling rate is approximately 50%, and the other ends of the living polymer are generally deactivated at an uncoupled state. The copolymer coupled with the multi-reactive polysiloxane compound is very excellent in affinity to an inorganic material, silica, and in low flow control. However, there is a limitation in enhancing the affinity to carbon black. There is also a demand for a scheme of utilizing the uncoupled living polymer more efficiently.

In an attempt to solve the problem with the copolymer coupled with the multi-reactive polysiloxane compound in regard to the deteriorated affinity to carbon black and to efficiently utilize the uncoupled ends of the living polymer, the present invention introduces a successive modification with a compound of the formula 2 or 3.

Namely, the active ends of the living polymer not treated with the multi-reactive polysiloxane compound are deactivated by subsequently adding a compound of the formula 2 or 3 in an amount of at least 10% with respect to the mole ratio of the active ends not treated with the multi-reactive polysiloxane compound.

The specific examples of the compound of the formula 2 include dimethylaminobenzophenone, or diethylaminobenzophenone, and those of the compound of the formula 3 include 1-methyl-2-pyrolidinone, 1-ethyl-2-pyrolidinone, etc. Among these compounds, diethylaminobenzophenone and 1-methyl-2-pyrolidione are most preferred.

In case of modifying the active ends of the polymer only with a compound of the formula 2 or 3, there is no functional group to induce affinity to silica in the copolymer. Eventually, the silica tire prepared from the copolymer has a limitation in its usage and, particularly, exhibits a high cold flow that is an important factor of storage stability, causing a problem in long-term storage. However, when performing a coupling reaction with a multi-reactive polysiloxane as in the present invention, the coupled copolymer is more limited in the movement of its main chain than in the uncoupled situation, providing drastically enhanced cold flow at the ambient temperature and solving the problem in regard to storage stability.

In addition, the modification of the active ends of the polymer with a compound of the formula 2 or 3 causes an increase in the compatibility of rubber with carbon black. Consequently, the copolymer prepared in the present invention has good compatibility with both silica and carbon black.

For a compound rubber for tires containing silica as a reinforcing agent, the preparation process is preferably performed so as to enhance the coupling rate of multi-reactive polysiloxane. For a compound rubber containing carbon black as a reinforcing agent, the preparation process can be carried out according to the subsequent step of modification with amine even when the coupling rate of the multi-reactive polysiloxane is not so high.

Although the coupling rate of the multi-reactive polysiloxane is approximately 50% with a compound rubber containing a mixture of silica and carbon black in the present invention, this can be variously changed within the spirit and scope of the invention as will be apparent to those skilled in the art.

The Mooney viscosity of the polymer thus obtained is in the range of 20 to 200, preferably 30 to 160. The vinyl content of the conjugated diene compound in the fine structure is in the range of 10 to 90 wt. %, preferably 30 to 80 wt. %.

Regarding the analysis of the polymer synthesized in the present invention, NMR (Nuclear Magnetic Resonance) is used to measure the fine structure of the conjugated diene compound, the composition ratio of the conjugated diene compound and the vinyl aromatic compound, and the random and block percentages of the conjugated diene compound and the aromatic vinyl compound, and GPC (Gel Permeation Chromatography) is used to determine coupling number (CN), coupling efficiency (CE), molecular weight (Mw), and molecular weight distribution (Mwd). The Mooney viscosity of the rubber is analyzed with a Mooney viscometer, and the cold flow is measured with a cold flow meter.

DETAILED DESCRIPTION OF THE INVENTION

Now, the present invention will be described in further detail by way of the following Examples, which are provided to describe the preparation method, the coupling rate, the Mooney viscosity and the vinyl bond percentage of the SBR random copolymer of the present invention and not intended to limit the scope of the present invention. If not specifically stated otherwise, the percentage (%) is given on the basis of weight.

EXAMPLE 1

150 g of styrene, 438 g of 1,3-butadiene, and 2,400 g of cyclohexane were added to a 10 L stainless steel reactor, and 84 g of tetrahydrofuran was then added to the reaction mixture. The inner temperature of the reactor was adjusted to 25° C. while stirring the reaction mixture with an agitator. When the reactor temperature amounts to the predetermined temperature, 4 mmol of n-butyllithium was added to the reactor to proceed an adiabatic warming reaction. The degree of polymerization was determined while observing the change of the reaction temperature, and a small amount of the reaction mixture was collected at any time during the reaction to analyze the monomer ratio and the conversion rate. At the time when the reaction temperature is at maximum, another 12 g of 1,3-butadiene was added so as to substitute the ends of the product with butadiene.

After the another addition of butadiene, 0.5 mmol of α,ω-bis(2-trichlorosilylethyl)polydimethylsiloxane having a number average molecular weight (Mn) of 1,345 used as a coupling agent was added to the reactor. The reaction mixture was kept for a predetermined time to proceed a coupling reaction.

After the completion of the coupling reaction, 2 mmol of 4,4-diethylaminobenzophenone was added to the reactor to substitute the uncoupled active ends of the polymer with 4,4-diethylaminobenzophenone, and 6 g (1 phr) of butylated hydroxy toluene (BHT) as an antioxidant was added to the reactor to complete the reaction. The resulting material was added to streamed water, stirred and removed of the solvent. Subsequently, the resulting material was removed of the residual solvent and water by roll drying.

The product thus obtained was analyzed in regard to the molecular fine structure by NMR, the molecular weight, the coupling number, the coupling rate, and the molecular weight distribution by GPC, the cold flow with a cold flow meter, and the dynamic property of the rubber by DMTA. The results are presented in Table 1.

EXAMPLE 2

The procedures were performed to prepare a copolymer in the same manner as described in Example 1, excepting that 2 mmol of 1-methyl-2-pyrolidinone was added to the reactor after the completion of the coupling reaction to substitute the uncoupled active ends of the polymer with 1-methyl-pyrolidinone, 6 g (1 phr) of BHT being then added as an antioxidant to complete the reaction. After the completion of the reaction, the polymer thus obtained was treated in the same manner as described in Example 1. The analysis results are presented in Table 1.

EXAMPLE 3

The procedures were performed to prepare a copolymer in the same manner as described in Example 1, excepting that 3.4 mmol of n-butyllithium was added to proceed the reaction, 0.3 mmol of α,ω-bis(2-trichlorosilylethyl)polydimethylsiloxane having a number average molecular weight(Mn) of 1,345 used as a coupling agent being added after the completion of the another addition of 1,3-butadiene to proceed a coupling reaction, and that 2.2 mmol of 4,4-diethylaminobenzophenone was added to the reactor after the completion of the coupling reaction to substitute the uncoupled active ends of the polymer with 4,4-diethylaminobenzophenone, 6 g (1 phr) of BHT being then added as an antioxidant to complete the reaction. After the completion of the reaction, the polymer thus obtained was treated in the same manner as described in Example 1. The analysis results are presented in Table 1.

EXAMPLE 4

The procedures were performed to prepare a copolymer in the same manner as described in Example 1, excepting that 4.6 mmol of n-butyllithium was added to proceed the reaction, 0.75 mmol of α,ω-bis(2-trichlorosilylethyl)polydimethylsiloxane having a number average molecular weight (Mn) of 1,345 used as a coupling agent being added after the completion of the another addition of 1,3-butadiene to proceed a coupling reaction, and that 1.6 mmol of 4,4-diethylaminobenzophenone was added to the reactor after the completion of the coupling reaction to substitute the uncoupled active ends of the polymer with 4,4-diethylaminobenzophenone, 6 g (1 phr) of BHT being then added as an antioxidant to complete the reaction. After the completion of the reaction, the polymer thus obtained was treated in the same manner as described in Example 1. The analysis results are presented in Table 1.

EXAMPLE 5

The procedures were performed to prepare a copolymer in the same manner as described in Example 3, excepting that 2.2 mmol of 1-methyl-2-pyrolidinone was added to the reactor after the completion of the coupling reaction to substitute the uncoupled active ends of the polymer with 1-methyl-2-pyrolidinone, 6 g (1 phr) of BHT being then added as an antioxidant to complete the reaction. After the completion of the reaction, the polymer thus obtained was treated in the same manner as described in Example 1. The analysis results are presented in Table 1.

EXAMPLE 6

The procedures were performed to prepare a copolymer in the same manner as described in Example 4, excepting that 1.6 mmol of 1-methyl-2-pyrolidinone was added to the reactor after the completion of the coupling reaction to substitute the uncoupled active ends of the polymer with 1-methyl-2-pyrolidinone, 6 g (1 phr) of BHT being then added as an antioxidant to complete the reaction. After the completion of the reaction, the polymer thus obtained was treated in the same manner as described in Example 1. The analysis results are presented in Table 1.

TABLE 1

| Example | Coupling Rate (%) | Coupling Number | Mw[1] | Mooney Viscosity (ML @ 1 + 4 100° C.) | Styrene Content (%) | Vinyl Content (%)[2] | Molecular weight Distribution[3] | Low Flow (mg/min)[4] |
|---|---|---|---|---|---|---|---|---|
| 1 | 52 | 4.2 | 391,000 | 53 | 25 | 62 | 2.21 | 0.0 |
| 2 | 51 | 4.2 | 388,000 | 52 | 25 | 62 | 2.21 | 0.0 |
| 3 | 36 | 4.3 | 379,000 | 51 | 25 | 62 | 2.2 | 0.51 |
| 4 | 64 | 4.1 | 385,000 | 52 | 25 | 62 | 2.3 | 0.0 |
| 5 | 34 | 4.3 | 383,000 | 51 | 25 | 62 | 2.2 | 0.62 |
| 6 | 66 | 4.1 | 385,000 | 52 | 25 | 62 | 2.31 | 0.0 |

Note:
[1]Mw: Weight average molecular weight
[2]Result of NMR analysis
[3]Molecular weight distribution: distribution of total molecular weight.
[4]Measured in a convection vacuum oven at 50° C.

COMPARATIVE EXAMPLE 1

The procedures were performed to prepare a copolymer in the same manner as described in Example 1, excepting that 6 g (1 phr) of BHT was added as an antioxidant after the coupling reaction was completed. After the completion of the reaction, the polymer thus obtained was treated in the same manner as described in Example 1. The analysis results are presented in Table 2.

COMPARATIVE EXAMPLE 2

The procedures were performed to proceed the reaction in the same manner as described in Example 1, excepting that 2.3 mmol of n-butyllithium was added to proceed the reaction and that 2.3 mmol of 4,4-bis-diethylaminobenzophenone was added to the reactor after another addition of 1,3-butadiene to modify all the active ends of the polymer with 4,4-bis-diethylaminobenzophenone, 6 g (1 phr) of BHT being then added to the reactor as an antioxidant to complete the modification. The polymer thus obtained was treated in the same manner as described in Example 1. The analysis results are presented in Table 2.

COMPARATIVE EXAMPLE 3

The procedures were performed to proceed the reaction in the same manner as described in Example 1, excepting that 2.3 mmol of 1-methyl-2-pyrolidinone was added to the reactor after another addition of 1,3-butadiene to modify all the active ends of the polymer with 1-methyl-2-pyrolidinone, 6 g (1 phr) of BHT being then added to the reactor as an antioxidant to complete the modification. The polymer thus obtained was treated in the same manner as described in Example 1. The analysis results are presented in Table 2.

TABLE 2

| Comparative Example | Coupling Rate (%) | Coupling Number | Mw[1] | Mooney Viscosity (ML @ 1 + 4 100° C.) | Styrene Content (%) | Vinyl Content (%)[2] | Molecular weight Distribution[3] | Low Flow (mg/min)[4] |
|---|---|---|---|---|---|---|---|---|
| 1 | 50 | 4.2 | 388,000 | 51 | 25 | 62 | 2.21 | 0.0 |
| 2 | — | — | 296,000 | 49 | 25 | 62 | 2.18 | 6.5 |
| 3 | — | — | 288,000 | 49 | 25 | 62 | 2.18 | 6.2 |

Note:
[1]Mw: Weight average molecular weight.
[2]Result of NMR analysis.
[3]Molecular weight distribution: distribution of total molecular weight.
[4]Measured in a convection vacuum oven at 50° C.

Copolymer manufactured through the examples of the present invention has 2-component functional group of hydrophilic and hydrophobic within one molecule, as compared with copolymer of the comparative examples, it has a very prominent compatibility with hydrophilic silica and a hydrophobic carbon black. Also, the copolymer through the examples of the present invention is easy to freely control a charge amount of functional group of the hydrophilic and hydrophobic adequately to the purpose of use tire and to a performance control.

The copolymer of the comparative examples 2 and 3 has a linear molecule structure and this creates some problems in storage of products because there is a very high low-temperature fluidity under normal temperature after manufacture of rubber, and furthermore, processability therefore is very dissatisfactory in comparison with the copolymer of the present invention.

COMPOSITION EXAMPLES 1 TO 9

The respective polymers prepared in Examples 1 and 2, and Comparative Examples 1, 2 and 3 were used to carry out a compounding with silica, and the compositions thus obtained were compared in regard to compounding processability and dynamic properties after compounding. The compounding conditions are presented in Table 3, and the measurements of mechanical and dynamic properties are presented in Table 4.

More specifically, the measurement methods of properties are as follows.

The hardness was measured with a SHORE-A hardness meter. The tensile strength, the 300% modulus and the elongation percentage of the compound rubber were measured with a universal test machine (UTM) according to the ASTM 3189 Method B. The dynamic property of the vulcanized rubber, Tan δ value was analyzed with a DMTA 5 supplied from Rheometic Company at a frequency of 10 Hz and under a 0.1% deformation condition.

TABLE 3

| Ingredient | Content (g) |
|---|---|
| Polymer | 100 |
| Stearic acid | 2.0 |
| ZnO | 3.0 |
| Silica #175 | 50 |
| Aromatic oil | 10 |
| Si-69 | 4.0 |
| CZ | 2.0 |
| DPG | 2.0 |
| Sulfur | 1.6 |
| Total | 184.6 |

Note:
*Si-69: Bis-(triethoxysilylpropyl)tetrasulfane
*CZ: N-Cyclohexylbenzothiazyl sulfenamide
*DPG: 1,3-Diphenyl guanidine

TABLE 4

| | | com[1] 1 | com[1] 2 | com[1] 3 | com[1] 4 | com[1] 5 | com[1] 6 | com[1] 7 | com[1] 8 | com[1] 9 |
|---|---|---|---|---|---|---|---|---|---|---|
| Polymer | Sample no. | EX[2] 1 | EX[2] 2 | EX[2] 3 | EX[2] 4 | EX[2] 5 | EX[2] 6 | CEX[3] 1 | CEX[3] 2 | CEX[3] 3 |
| | Coupling agent | PS[4] | PS[4] | PS[4] | PS[4] | PS[4] | PS[4] | PS[4] | — | — |
| | End modifier | EAB[5] | NMP[6] | EAB[5] | EAB[5] | NMP[6] | NMP[6] | — | EAB[5] | NMP[6] |
| PS/EAB(NMP) ratio (%) | | 52/48 | 51/49 | 36/64 | 64/36 | 34/66 | 66/34 | 50/0 | 0/100 | 0/100 |
| Mooney viscosity[1] | | 92 | 91 | 93 | 91 | 94 | 90 | 90 | 103 | 101 |
| Hardness (Shore-A) | | 76 | 76 | 76 | 76 | 76 | 76 | 76 | 75 | 75 |
| Tensile strength (kgf/cm²) | | 190 | 187 | 180 | 205 | 185 | 200 | 185 | 167 | 160 |
| 300% Modulus (kgf/cm²) | | 154 | 157 | 160 | 155 | 161 | 155 | 156 | 140 | 143 |

TABLE 4-continued

|  | com(1) 1 | com(1) 2 | com(1) 3 | com(1) 4 | com(1) 5 | com(1) 6 | com(1) 7 | com(1) 8 | com(1) 9 |
|---|---|---|---|---|---|---|---|---|---|
| Elongation at break (%) | 380 | 400 | 380 | 390 | 400 | 410 | 380 | 370 | 350 |
| Tg (° C.) | 1.1 | 0.9 | −1.0 | 1.5 | 0.2 | 1.8 | −0.8 | −2.7 | −2.5 |
| Tan δ at 10° C. | 0.5073 | 0.5123 | 0.4982 | 0.5271 | 0.5101 | 0.5357 | 0.4882 | 0.4552 | 0.4328 |
| Tan δ at 60° C. | 0.0674 | 0.0654 | 0.0679 | 0.0651 | 0.0657 | 0.0633 | 0.0689 | 0.0721 | 0.0752 |

Note:
com(1): Composition Example
EX(2): Example
CEX(3): Comparative Example
PS(4): Multi-reactive polysiloxane (Mn 1345)
EAB(5): 4,4-Bis diethyl aminobenzophenone
NMP(6): 1-Methyl-2-pyrolidinone COMPOSITION EXAMPLES 10 to 18

The respective polymers prepared in Examples 1 and 2, and Comparative Examples 1, 2 and 3 were used to carry out a compounding with carbon black, and the compositions thus obtained were compared in regard to compounding processability and dynamic properties after compounding. The compounding conditions are presented in Table 5, and the measurements of mechanical and dynamic properties are presented in Table 6.

TABLE 5

| Ingredient | Content (g) |
|---|---|
| Polymer | 100 |
| Carbon black | 50 |
| ZnO | 3.0 |
| SA | 1.0 |
| Sulfur | 1.75 |
| NS | 1.00 |
| Total | 1.0 |

*SA: Stearic Acid
*NS: N-(1,1-dimethylethyl)2-benzothiazolsulfoneamide

TABLE 6

|  |  | com(1) 10 | com(1) 11 | com(1) 12 | com(1) 13 | com(1) 14 | com(1) 15 | com(1) 16 | com(1) 17 | com(1) 18 |
|---|---|---|---|---|---|---|---|---|---|---|
| Polymer | Sample no. | EX(2) 1 | EX(2) 2 | EX(2) 3 | EX(2) 4 | EX(2) 5 | EX(2) 6 | CEX(3) 1 | CEX(3) 2 | CEX(3) 3 |
|  | Coupling agent | PS(4) | PS(4) | PS(4) | PS(4) | PS(4) | PS(4) | PS(4) | — | — |
|  | End modifier | EAB(5) | NMP(6) | EAB(5) | EAB(5) | NMP(6) | NMP(6) | — | EAB(5) | NMP(6) |
| PS/EAB(NMP) ratio (%) |  | 52/48 | 51/49 | 36/64 | 64/36 | 34/66 | 66/34 | 50/0 | 0/100 | 0/100 |
| Mooney viscosity1) |  | 105 | 103 | 101 | 102 | 105 | 103 | 99 | 110 | 112 |
| Hardness (Shore-A) |  | 74 | 74 | 74 | 74 | 74 | 74 | 74 | 73 | 73 |
| Tensile strength (kgf/cm²) |  | 235 | 230 | 241 | 215 | 235 | 220 | 195 | 205 | 202 |
| 300% Modulus (kgf/cm²) |  | 185 | 182 | 180 | 178 | 195 | 190 | 156 | 140 | 143 |
| Elongation at break (%) |  | 430 | 410 | 480 | 360 | 460 | 470 | 400 | 410 | 420 |
| Tg (° C.) |  | 1.7 | 1.5 | 1.9 | 0.5 | 1.8 | 0.39 | −1.0 | 0.3 | 0.1 |
| Tan δ at 10° C. |  | 0.5583 | 0.5685 | 0.5887 | 0.4941 | 0.5877 | 0.4852 | 0.5245 | 0.5341 | 0.5451 |
| Tan δ at 60° C. |  | 0.0951 | 0.0945 | 0.0886 | 0.0952 | 0.0857 | 0.0923 | 0.0962 | 0.0952 | 0.0978 |

Note:
com(1): Composition Example
EX(2): Example
CEX(3): Comparative Example
PS(4): Multi-reactive polysiloxane (Mn 1345)
EAB(5): 4,4-Bis diethyl aminobenzophenone
NMP(6): 1-Methyl-2-pyrolidinone

COMPOSITION EXAMPLES 19 to 27

The respective polymers prepared in Examples 1 and 2, and Comparative Examples 1, 2 and 3 were used to prepare applied compositions by silica-carbon black compounding, and the compositions thus obtained were compared in regard to compounding processability and dynamic properties after compounding. The compounding conditions are presented in Table 7, and the measurements of mechanical and dynamic properties according to the above-described methods are presented in Table 8.

TABLE 7

| Ingredients | Content (g) |
|---|---|
| Polymer | 100 |
| Stearic acid | 2.0 |
| ZnO | 3.0 |
| Silica #175 | 20 |
| Carbon black (N-330) | 30 |
| Aromatic oil | 18.0 |
| Si-69 | 1.6 |
| CZ | 2.0 |
| DPG | 2.0 |
| Sulfur | 1.5 |
| Total | 180.1 |

*Si-69: Bis-(triethoxysilylpropyl)tetrasulfane
*CZ: N-Cyclohexylbenzothiazyl sulfenamide
*DPG: 1,3-Diphenyl guanidine

TABLE 8

| | | com[1] 19 | com[1] 20 | com[1] 21 | com[1] 22 | com[1] 23 | com[1] 24 | com[1] 25 | com[1] 26 | com[1] 27 |
|---|---|---|---|---|---|---|---|---|---|---|
| Polymer | Sample no. | EX[2] 1 | EX[2] 2 | EX[2] 3 | EX[2] 4 | EX[2] 5 | EX[2] 6 | CEX[3] 1 | CEX[3] 2 | CEX[3] 3 |
| | Coupling agent | PS[4] | PS[4] | PS[4] | PS[4] | PS[4] | PS[4] | PS[4] | — | — |
| | End modifier | EAB[5] | NMP[6] | EAB[5] | EAB[5] | NMP[6] | NMP[6] | — | EAB[5] | NMP[6] |
| PS/EAB(NMP) ratio (%) | | 52/48 | 51/49 | 36/64 | 64/36 | 34/66 | 66/34 | 50/0 | 0/100 | 0/100 |
| Mooney viscosity[1] | | 49 | 48 | 51 | 47 | 52 | 48 | 48 | 59 | 61 |
| Hardness (Shore-A) | | 66 | 66 | 66 | 66 | 66 | 66 | 66 | 65 | 65 |
| Tensile strength (kgf/cm$^2$) | | 195 | 193 | 189 | 190 | 187 | 188 | 178 | 173 | 172 |
| 300% Modulus (kgf/cm$^2$) | | 110 | 105 | 108 | 103 | 105 | 106 | 98 | 110 | 108 |
| Elongation at break (%) | | 500 | 510 | 510 | 520 | 510 | 550 | 510 | 450 | 480 |
| Tg (° C.) | | −0.2 | −0.2 | −0.1 | −0.15 | −0.05 | −0.01 | −1.5 | −3.1 | −2.8 |
| Tan δ at 10° C. | | 0.5583 | 0.5589 | 0.5621 | 0.5498 | 0.5684 | 0.5546 | 0.4995 | 0.4586 | 0.4748 |
| Tan δ at 60° C. | | 0.0732 | 0.0725 | 0.0751 | 0.0762 | 0.0754 | 0.0762 | 0.0785 | 0.0896 | 0.0889 |

Note:
com[1]: Composition Example
EX[2]: Example
CEX[3]: Comparative Example
PS[4]: Multi-reactive polysiloxane (Mn 1345)
EAB[5]: 4,4-Bis diethyl aminobenzophenone
NMP[6]: 1-Methyl-2-pyrolidinone As described above, when the rubber synthesized by coupling the ends of a living polymer with a multi-reactive polysiloxane compound of the formula 1 and then modifying the ends of the polymer with a compound of the formula 2 or 3 according to the present invention is used as a tire material, the tire thus obtained has a low compound Mooney viscosity, which is an index of processability, relative to linear polymers, to exhibit good processability, and especially shows remarkably improved compatibility with a reinforcing agent, i.e., silica and carbon black as used in the fabrication of tires, with high affinity to silica increased by a coupling with multi-reactive polysiloxane and high affinity to carbon black by modification of ends with amine. Eventually, the tire can have an enhanced tread wear performance with high wet traction and low rolling resistance, as required for tires in all the compositions containing an inorganic filling material, including a silica-carbon black combination as well as carbon black, or silica alone.

What is claimed is:
1. A method for preparing a copolymer, comprising:
   (a) copolymerizing a conjugated diene monomer and a vinyl aromatic monomer in the presence of an organolithium catalyst in a hydrocarbon solvent and a Lewis base to obtain a living polymer;
   (b) coupling the living polymer with a multi-reactive polysiloxane represented by the following formula 1; and
   (c) subsequently modifying the uncoupled active ends of the living polymer with a compound represented by the following formula 2 or 3:

$$(X)_a(R)_b Y-[CH_2]_c-Si(R^1)(R^2)-[O-Si(R^1)(R^2)]_d-[CH_2]_c-Y(X)_a(R)_b \quad \text{Formula 1}$$

wherein X is a halogen atom; Y is Si or C; R is a lower alkyl group having less than 20 carbon atoms; $R^1$ is a hydrogen atom, a halogen-substituted alkyl group, a halogen-substituted silane group, or the same as R; $R^2$ is halogen atom, or the same as $R^1$; a is from 1 to 3; b is (3-a), wherein a+b=3; c is from 1 to 1000; and d is from 1 to 50000,

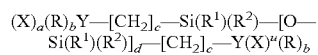

$$(R_2^3 NBz)_2 CO \quad \text{Formula 2}$$

wherein $R^3$ is a lower alkyl group having less than 20 carbon atoms; and Bz is a benzene ring,

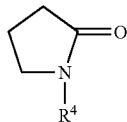

Formula 3 wherein R₄ is a lower alkyl group having less than 20 carbon atoms.

2. The method as claimed in claim 1, wherein the conjugated diene monomer includes 1,3-butadiene, and the vinyl aromatic monomer includes styrene 3. The method as claimed in claim 1, wherein the multi-reactive polysiloxane represented by the formula 1 includes αω-bis(2-trichlorosilylethyl)polydimethylsiloxane.

4. The method as claimed in claim 1, wherein the compound represented by the formula 2 includes dimethyl aminobenzophenone, or diethyl aminobenzophenone.

5. The method as claimed in claim 1, wherein the multi-reactive polysiloxane represented by the formula 1 is used in an amount of 0.01 to 0.5 mole based on 1 mole of the living polymer.

6. The method as claimed in claim 1, wherein the multi-reactive polysiloxane represented by the formula 1 is used in an amount of 0.05 to 0.2 mole based on 1 mole of the living polymer.

7. The method as claimed in claim 1, wherein the compound represented by the formula 2 or 3 is used in an amount of at least 10 mole ratio % with respect to 100% of the active ends of the living polymer not coupled with the multi-reactive polysiloxane.

8. The method as claimed in claim 1, wherein the copolymer comprises 5 to 50 wt. % of the vinyl aromatic monomer, and 50 to 95 wt. % of the conjugated diene compound.

9. The method as claimed in claim 1, wherein the conjugated diene monomer and a vinyl aromatic monomer in the (a) step are produced in an amount of 5 to 40 wt % in the hydrocarbon solvent.

10. The method as claimed in claim 1, wherein the conjugated diene monomer includes 1,3-butadiene and the vinyl aromatic monomer includes alpha-methyl styrene.

11. The method as claimed in claim 1, wherein the conjugated diene monomer includes isoprene; and the vinyl aromatic monomer includes styrene.

12. The method as claimed in claim 1, wherein the conjugated diene monomer includes isoprene; and the vinyl aromatic monomer includes alpha-methyl styrene.

13. The method as claimed in claim 1, wherein the multi-reactive polysiloxane represented by the formula 1 includes at least one selected from the group consisting of α, ωbis(2-dichloromethylsilylethyl)polydimethylsiloxane, and α, ωbis(2-chlorodimethylsilylethyl)polydimethylsiloxane.

14. The method as claimed in claim 1, wherein the compound represented by the formula 3 includes 1-methyl-2-pyrolidinone or 1-ethyl-2-pyrolidinone.

* * * * *